US006865430B1

(12) United States Patent
Runton et al.
(10) Patent No.: US 6,865,430 B1
(45) Date of Patent: Mar. 8, 2005

(54) METHOD AND APPARATUS FOR THE DISTRIBUTION AND ENHANCEMENT OF DIGITAL COMPRESSED AUDIO

(76) Inventors: David W. Runton, 1666 W. Bluebird Dr., Chandler, AZ (US) 85248; Peter A. Smith, 1416 W. Lark Dr., Chandler, AZ (US) 85248

( * ) Notice: Subject to any disclaimer, the term of this patent is extended or adjusted under 35 U.S.C. 154(b) by 0 days.

(21) Appl. No.: 09/393,525

(22) Filed: Sep. 10, 1999

(51) Int. Cl.7 .................................................. G06F 17/00
(52) U.S. Cl. .............................. 700/94; 381/61; 381/62
(58) Field of Search ............................ 381/119, 62, 98, 381/118, 61; 84/660, 625; 700/94

(56) References Cited

U.S. PATENT DOCUMENTS 4,150,253 A 4/1979 Knoppel
5,133,014 A * 7/1992 Pritchard ..................... 381/61
5,579,430 A 11/1996 Grill et al.
5,789,689 A 8/1998 Doidic et al.
5,792,971 A * 8/1998 Timis et al. .................. 84/609
5,897,620 A 4/1999 Walker et al.

* cited by examiner

*Primary Examiner*—Ping Lee
(74) *Attorney, Agent, or Firm*—Parsons&Goltry; Robert A. Parsons; Michael W. Goltry

(57) ABSTRACT

Disclosed are apparatus and methods of enhancing digital audio signals after compression and decompression. The methods and apparatus include receiving a digital decompressed audio signal, harmonically enhancing the signal, adding warmth to the signal, and combining and frequency equalizing the harmonically enhanced audio signal and the warmth enhanced audio signal to provide a digital enhanced decompressed audio signal. The apparatus is preferably provided in software as instructions to a DSP. Adjustments are included within the software for varying levels of the harmonic enhancing and for varying levels of the frequency equalizing. Methods of distribution are disclosed which include providing the software free with the inclusion in the software of either a one-time use, a partial use, a partially enhanced audio signal use, or non-save adjustments, and selling the software for a price without including the one-time use, the partial use, the partially enhanced audio signal use, or the non-save adjustments.

31 Claims, 4 Drawing Sheets

Processor Block Diagram

Transistor / IC
A
-1
-A
30
31
32
Warmth Adder
Tube
A
-1
-A
35
36
37

+8000
-8000
=
16000
8000
0

METHOD AND APPARATUS FOR THE DISTRIBUTION AND ENHANCEMENT OF DIGITAL COMPRESSED AUDIO

FIELD OF THE INVENTION

This invention relates to methods and apparatus for distributing and enhancing sound which was digitally compressed and then decompressed.

More particularly, the present invention relates to apparatus for reconstructing lost audio which has been digitally compressed and decompressed.

In a further and more specific aspect, the instant invention concerns methods of distributing to consumers reconstructed lost audio which has been digitally compressed and decompressed.

BACKGROUND OF THE INVENTION

The distribution of digital audio through the world wide web (Internet) requires a significant amount of data compression. A compact disc (CD) quality song recorded in stereo requires nearly 10 MB of data per minute. Utilizing existing transfer methods available to the typical home user, this amount of data is considered unusable. To combat this, the Internet community has developed several different compression techniques for reducing the amount of data required to construct the audio signal. At the compression requirements, these algorithms are not perfect, resulting in loss of the data and subsequent audio quality degradation.

A specific compression/decompression algorithm is based on MPEG 1, audio layer 3, and is commonly referred to as MP3. An MP3 formatted file contains audio data that has been processed through a compression algorithm. The file can be stored on a computer hard drive, floppy disk, or any other storage medium such as flash RAM cards. The MP3 file format was developed to compress the large amounts of data stored on music CDs to less than one tenth of the original size of the data. The compressed data can then easily be sent over the Internet or stored on computer hard drives, etc. The major problem that arises is in the quality of music that has been compressed and then decompressed for listening.

Even though some enhancement is performed during the decompression of the data in an attempt to reconstruct the music, many of the qualities that make the music interesting or enjoyable are lost. Further, because of the lost data during compression/decompression, the compression/decompression technique cannot be used in many other fields where the lost data may be important (e.g. some teaching techniques, such as speech and listening therapy). Many different attempts to enhance music to improve the quality have been made in the past but each such attempt is directed at a specific problem (generally the attempt deals with improving the response of a specific amplifier) and generally requires specific hardware to solve, or partially solve, the specific problem. Also, because in many instances individuals are receiving the data or music from the Internet, it is difficult to provide a salable technique for improving the decompressed data.

Accordingly, it is an object of the present invention to provide new and improved methods and apparatus/software for the distribution and enhancement of digital compressed/decompressed audio.

Another object of the invention is to provide new and improved apparatus/software for restoring decompressed data to substantially its original content.

And another object of the invention is to provide new and improved apparatus/software for restoring decompressed data to substantially its original content, which apparatus itself can be sold over the Internet or by equivalent means.

Still another object of the present invention is to provide new and improved methods for distributing the apparatus software.

Yet another object of the invention is to provide new and improved methods of distribution for the apparatus/software which provide a recipient the opportunity to try the apparatus software and determine if they believe it is appropriate for them.

SUMMARY OF THE INVENTION

Briefly, to achieve the desired objects of the instant invention in accordance with a preferred embodiment thereof apparatus for enhancing digital audio signals after the digital audio signals are compressed and decompressed is provided. The apparatus includes an input terminal for receiving a digital decompressed audio signal, a digital harmonic enhancer coupled to receive the digital decompressed audio signal and provide a harmonically enhanced audio signal, a digital warmth adder coupled to receive the digital decompressed audio signal and provide a warmth enhanced audio signal, and a digital frequency equalizer coupled to receive the harmonically enhanced audio signal and the warmth enhanced audio signal and provide a digital enhanced decompressed audio signal. In a preferred embodiment the apparatus is provided in the form of software as instructions for a Digital Signal Processor (DSP) or the like.

The desired objects of the instant invention are also achieved in accordance with a preferred embodiment thereof in method of enhancing digital audio signals after the digital audio signals are compressed and decompressed. The method includes the steps of receiving a digital decompressed audio signal, harmonically enhancing the digital decompressed audio signal and providing a harmonically enhanced audio signal, adding warmth to the digital decompressed audio signal and providing a warmth enhanced audio signal, and combining and frequency equalizing the harmonically enhanced audio signal and the warmth enhanced audio signal to provide a digital enhanced decompressed audio signal. Warmth, in the present context, is harmonic content considered pleasant to the ear, and is usually associated with enhanced odd order harmonics.

The desired objects of the instant invention are also achieved in accordance with a preferred embodiment thereof in method of distributing enhanced digital audio signals produced from compressed and decompressed digital audio signals. The distribution method includes the steps of providing software for a digital signal processor including harmonically enhancing the digital decompressed audio signal to provide a harmonically enhanced audio signal, adding warmth to the digital decompressed audio signal to provide a warmth enhanced audio signal, and combining and frequency equalizing the harmonically enhanced audio signal and the warmth enhanced audio signal to provide a digital enhanced decompressed audio signal, and providing adjustments within the software for varying levels of the harmonic enhancing and for varying levels of the frequency equalizing to provide the digital enhanced decompressed audio signal.

In one specific embodiment of the distribution procedure the software is provided free and either a one-time use, a partial use, a partially enhanced audio signal use, or non-save adjustments are included in the software to limit the use. The software is then sold for a price without including in the software the one-time use, the partial use, the partially enhanced audio signal use, or the non-save adjustments.

In another specific embodiment of the distribution procedure adjustments are provided within the software for varying levels of the harmonic enhancing and for varying levels of frequency equalizing to provide the digital enhanced decompressed audio signal, the adjustments are preset to levels determined by an expert of the received digital decompressed audio signal, such as a performer of music. In this fashion the user hears the music as the performer wants it to be heard. This method of distribution is a subset of mass customization, i.e. the software can be adjusted by the originator or consumer to tailor the desired sound.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
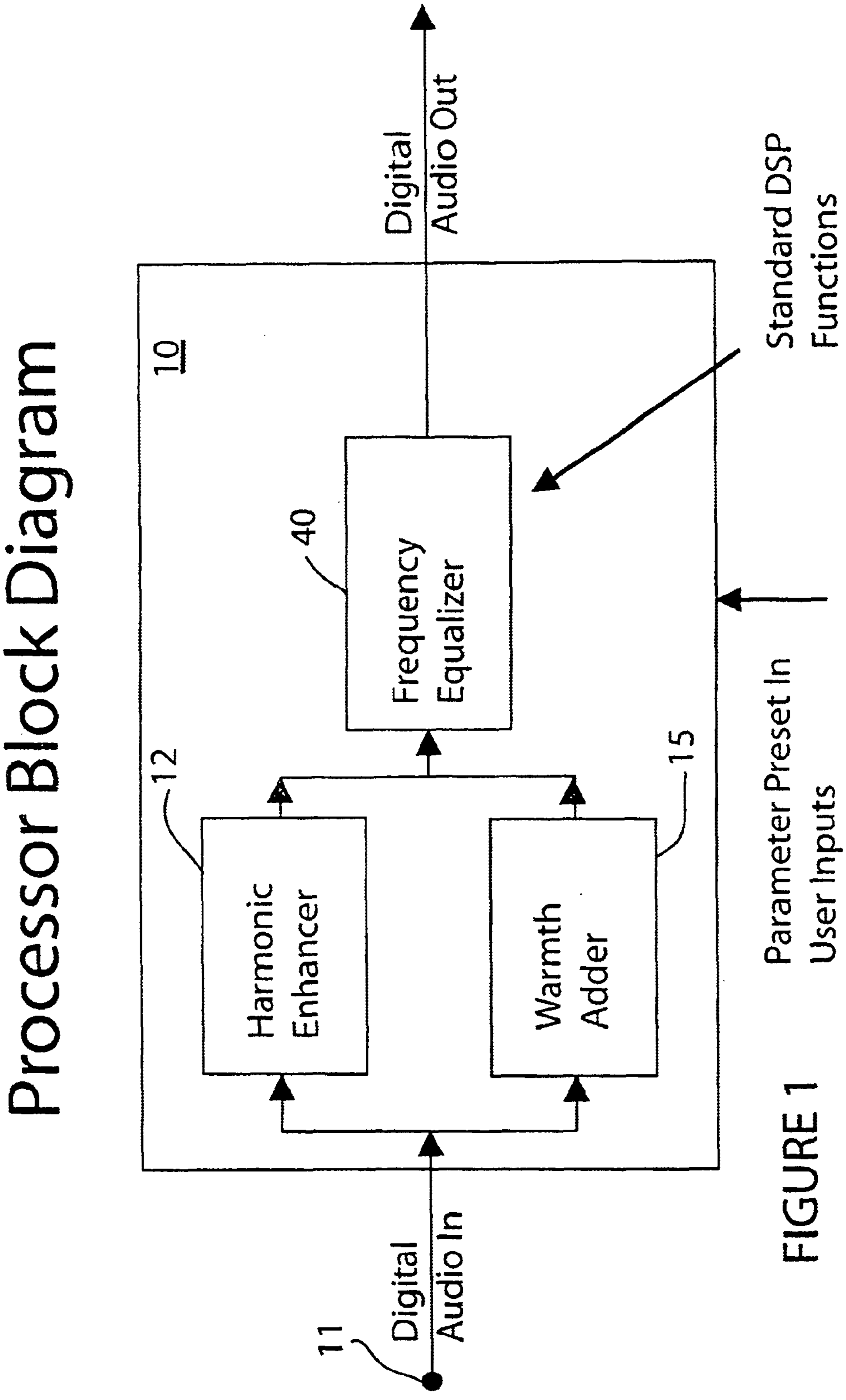
FIG. 1 is a block diagram of signal processing apparatus/software for enhancing digital audio signals after the digital audio signals are compressed and decompressed.

Turning now to the drawings in which like reference characters indicate corresponding elements throughout the several views, attention is first directed to FIG. 1 which illustrates a block diagram of signal processing apparatus/software 10 for enhancing digital audio signals after the digital audio signals are compressed and decompressed. Digital audio signals, which have been compressed and decompressed by some format or software, such as MP3, are received at an input terminal 11. The input digital audio signal is split and applied simultaneously to both a harmonic enhancer 12 and a warmth adder 15.

Figure 2:
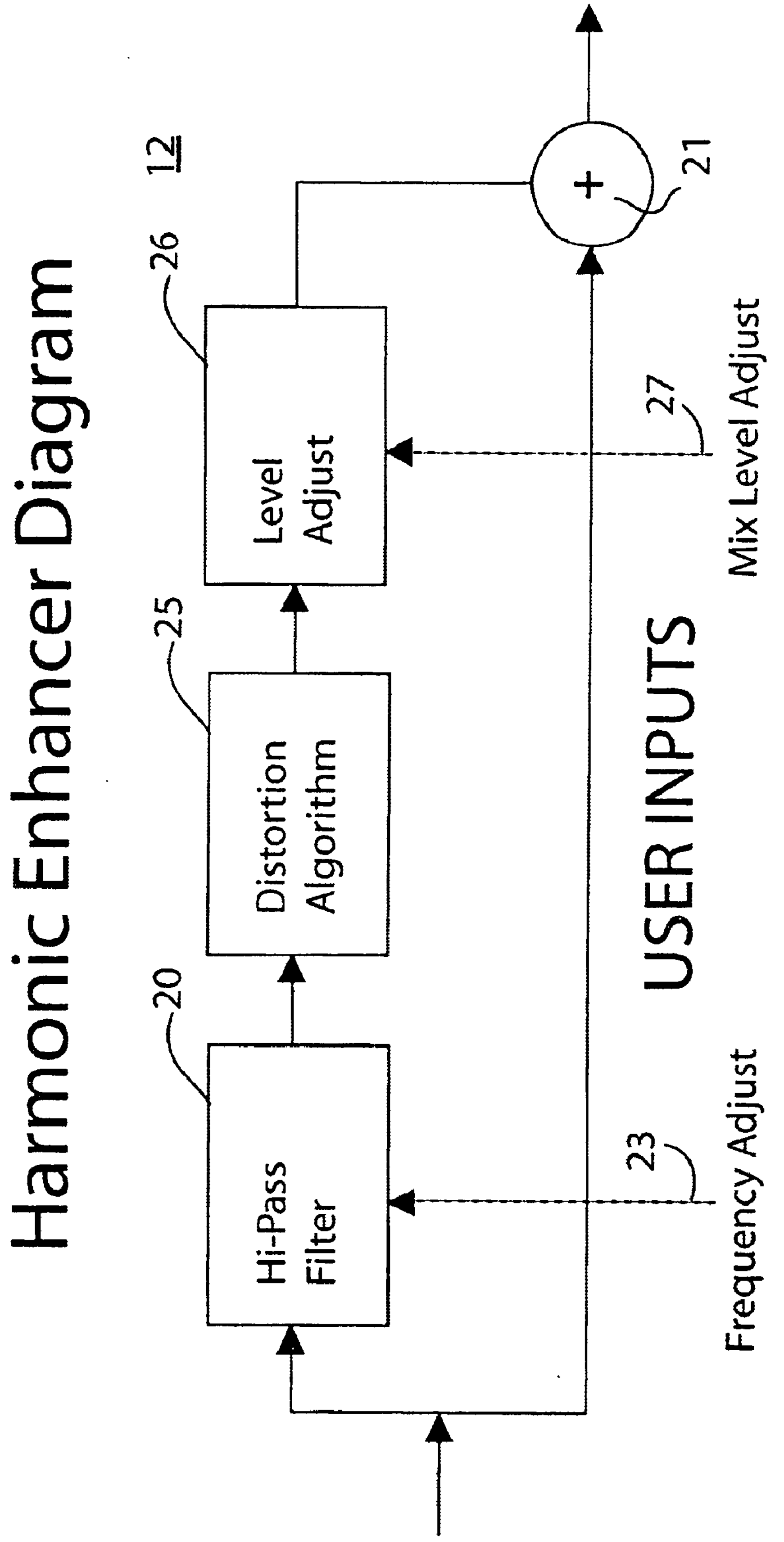
FIG. 2 is a more detailed block diagram of a harmonic enhancer portion of the signal processing apparatus of FIG. 1.

Referring additionally to FIG. 2, a more detailed block diagram of harmonic enhancer 12 is illustrated. The digital audio signal supplied to harmonic enhancer 12 is again split and applied to a digital hi-pass filter 20 and to one input of a digital adder 21. Hi-pass filter 20 has a specific bandpass and includes a frequency adjustment 23 which moves the bandpass of filter 20 to determines a specific band of frequencies within the input digital audio signal which will be passed by hi-pass filter 20.

The portion of the input digital audio signal passed by digital hi-pass filter 20 is supplied to a digital amplifier 25 coupled to provide harmonic distortion. Amplifier 25 is constructed to drive the input signal into saturation so as to provide an at least partially squared audio signal. This partially squared audio signal contains harmonics, both odd and even, and the amount of squaring, or saturation amplification, determines the specific harmonics included (i.e. second, third, fourth, fifth, etc.), as well as the amount of harmonics included in the output signal. As an example, an audio signal that is only slightly distorted by amplification into the saturation area (i.e. squared) contains only small amounts of the second and third harmonics. As the amplification is increased both the amount of the harmonics and the number of harmonics increases. Since, for example, most music contains certain harmonics and since some of these harmonics are lost during the compression/decompression process, it is important to achieve natural and pleasant sounding music that the harmonics be reconstructed after the decompression process. As can be seen from FIG. 2, only the portion of the digital audio signal passed by hi-pass filter 20 is amplified by amplifier 25 to provide a harmonic enhancement signal.

The harmonic enhancement signal from amplifier 25 is then supplied to a digital level adjuster 26 which provides a level adjusted harmonic enhancement signal to a second input of digital adder 21. Level adjuster 26 is provided with an adjustment 27 which determines the amount, or level of the harmonic enhancement signal that is applied to adder 21. Since the original digital audio signal supplied to input terminal 11 is supplied to one input of adder 21, the selected level of the harmonic enhancement signal that is applied to the other input of adder 21 is added to the original digital audio signal to provide a harmonically enhanced digital audio signal. Here it should be noted that frequency adjustment 23 of hi-pass filter 20 determines the frequency spectrum of the harmonic enhancement while adjustment 27 provides the level of the harmonic enhancement.

Figures 3, 4:
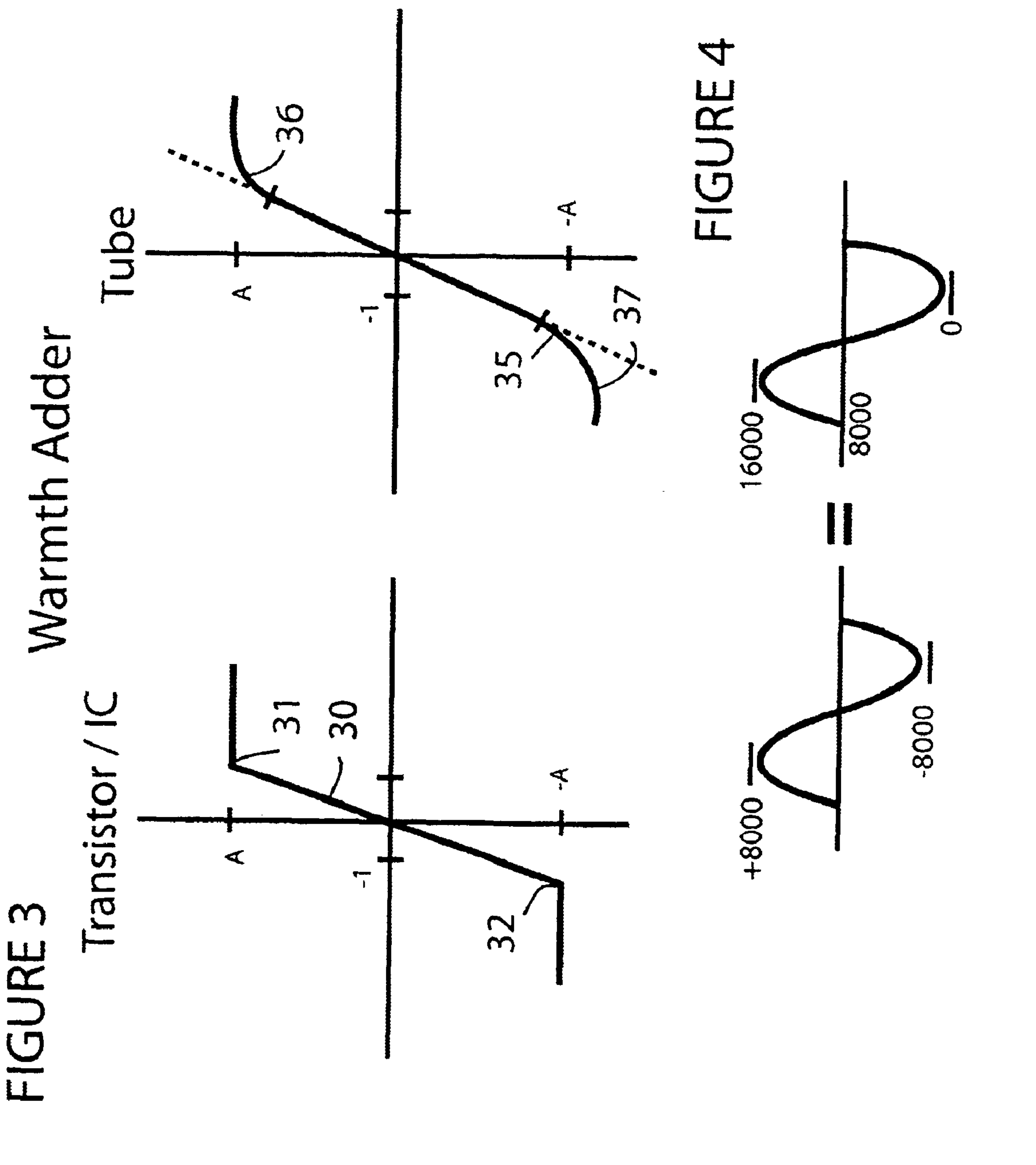
FIG. 3 illustrates a response curve for a prior art transistor amplifier.
FIG. 4 illustrates a response curve for the warmth adder of FIG. 1.

Referring specifically to FIG. 3, a typical response curve 30 for a transistor amplifier is illustrated. As can be seen, response curve 30 includes relatively sharp discontinuities at a positive saturation area 31 and at a negative saturation area 32. Discontinuities 31 and 32 produce some harsh and relatively unpleasant sounds in audio that is amplified to this level and, accordingly, transistor amplifiers are generally only used for amplification in the linear range of response curve 30.

Electronic tubes, on the other hand, have a response curve similar to curve 35 illustrated in FIG. 4. As can be seen, curve 35 is rounded or continuous and blends smoothly at upper and lower saturation areas 36 and 37 from the linear portion of curve 35 into the saturated portion. This smooth blending produces harmonics which add warmth to, for example, music and is a major reason that electronic tube amplifiers are preferred in the music field over transistor amplifiers. Referring to FIG. 1, warmth adder 15 includes a digital saturation amplifier in which the amplification is specifically adjusted to resemble curve 35 of FIG. 4. For purposes of this disclosure, the response curve of warmth adder 15 will hereinafter be referred to as an S-shaped response curve or a response curve that includes upper and lower saturation areas which are rounded (smoothed or continuous) to provide warmth distortion or a warmth enhanced digital audio signal.

Figure 5:
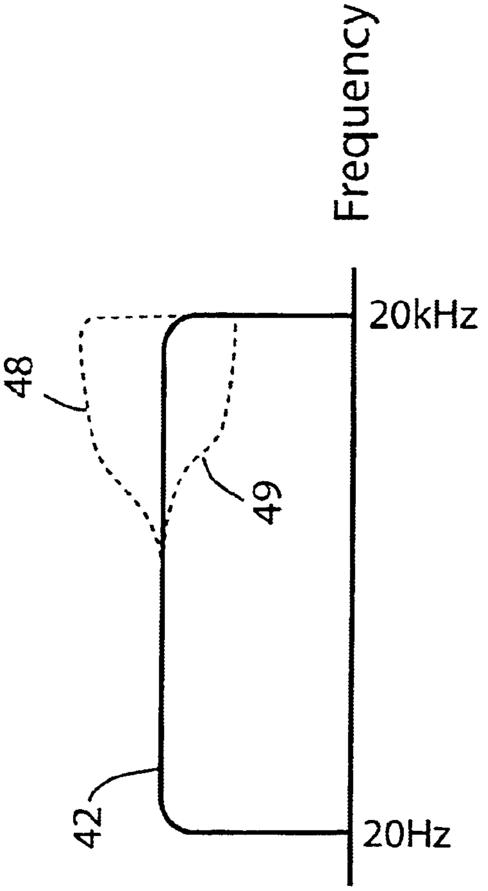
FIG. 5 is a typical frequency spectrum for the human ear, illustrating the effects of the frequency equalizer of FIG. 1.
Figure 6:
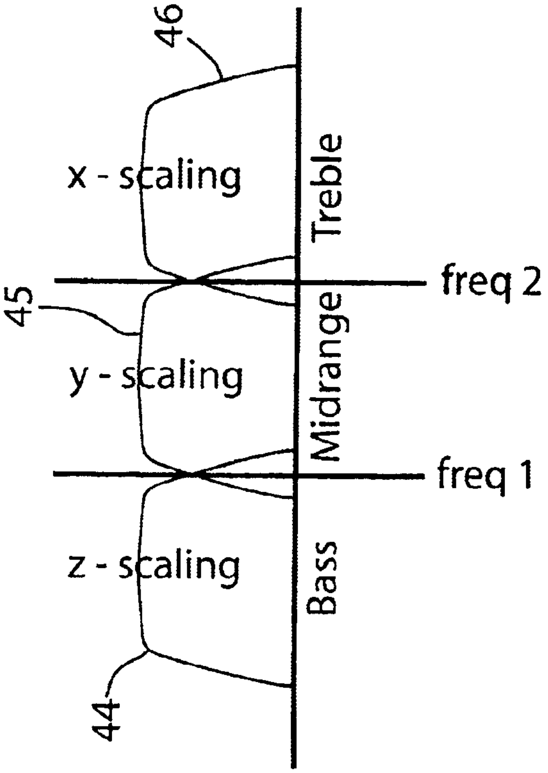
FIG. 6 illustrates response curves for various sections of the frequency equalizer of FIG. 1.

Turning again to FIG. 1, the harmonically enhanced digital audio signal from harmonic enhancer 12 and the warmth enhanced digital audio signal from warmth adder 15 are combined and supplied to a digital frequency equalizer 40. Illustrated in FIG. 5 is a typical frequency spectrum 42 for the human ear. Although there are many variations, weaknesses and strengths, a typical human ear can generally hear sounds from 20 Hz to 20 kHz. Frequency equalizer 40 breaks frequency spectrum 42 into a plurality of areas, for example, the three areas 44, 45, and 46 illustrated in FIG. 6. Here it should be understood that many more areas could be included or each area 44, 45, and 46 could be again split into a plurality of sub-areas. In this discussion area 44 is referred to as a base area, area 45 is referred to as a midrange area, and area 46 is referred to as a treble area.

Frequency equalizer 40 can include any or all of digital filters, generally for splitting frequency spectrum 40 into areas 44, 45, and 46, digital amplifiers for amplifying the frequency spectrum represented by each of the areas 44, 45, and 46, and attenuators for reducing the frequency spectrum represented by each of the areas 44, 45, and 46. Further, frequency equalizer 40 includes adjustments for each of the areas 44, 45, and 46 to alter the frequency spectrum or response for that area anywhere between amplification and attenuation. Referring to FIG. 5, as an example, a curve 48 illustrates a level of amplification in treble area 46 and a curve 49 illustrates a level of attenuation in treble area 46. The adjustment for treble area 46 is capable of changing the response curve anywhere from curve 48 to curve 49 and in a similar fashion each of the other areas can be changed.

Standard Digital Signal Processing, or DSP, is used to digitally modify incoming digital data to produce a desired output. Utilizing these techniques, it is possible to simulate any analog circuitry (including filters, amplifiers, adders, attenuators, etc.). The notation used for the DSP is:

$x[n] \text{->} H_T(e^{jw}) \text{->} y[n]$

In the above notation, x[n] is the input signal which is sampled in discrete time intervals, $H_T(e^{jw})$ is the processing algorithm, and y[n] is the output signal. Signal processing apparatus/software 10, described above, including harmonic enhancer 12, warmth adder 15, and frequency equalizer 40, are included in software in the form of instructions to a DSP which instructs the DSP to perform the various steps described. Typically, the software, or instructions, are included on some form of memory, such as a CD, or can be downloaded from the Internet to a personal computer (PC) or some other type of equipment containing a DSP or performing DSP functions. Here it should be understood by those skilled in the art that the term “Digital Signal Processor” (DSP), as used in this disclosure, includes chips and devices designated digital signal processors as well as any other devices which are capable of performing the function of digital signal processing.

Further, frequency adjust 23 for hi-pass filter 20, adjustment 27 for digital level adjuster 26, and parameter presets, or adjustments, for frequency equalizer 40 are included in the software and instruct the DSP to provide these adjustments on the PC, etc. in the same fashion that such adjustments are presently provided on a PC. In an alternative embodiment, these adjustments can be preset. For example, a specific piece (or album) of music might be supplied with preset parameters that adjust signal processing apparatus/software 10 in accordance with the way an expert, such as the performer of the music, would like their music to sound.

In a typical example of the use of signal processing apparatus/software 10, a person would download signal processing apparatus/software 10 from the Internet into their PC and would then either play compressed music directly from the Internet or from the hard disk of their computer, using signal processing apparatus/software 10. A problem that arises with the provision of this type of signal processing apparatus/software is the distribution, since the software can be easily downloaded from the Internet or from a CD or the like by anyone.

One distribution system that is used herein to overcome this problem is to provide-adjustments within the software for varying levels of the harmonic enhancing and for varying levels of the frequency equalizing to provide the digital enhanced decompressed audio signal and provide the software free to any and all recipients. However, the free software is programmed for a one-time use, a partial use, a partially enhanced audio signal use, or non-save adjustments. A one-time use is one in which the recipient can play the audio once to appreciate the improved sound and then must get another copy of signal processing apparatus/software 10. A partial use is one in which the recipient can play only a part of the audio with the improved sound and after that the sound is the same as standard decompressed audio. A partially enhanced use is one in which some of the improvements in sound are included but not all of them simultaneously. Non-save adjustments is one in which the recipient must make all of the adjustments each time that he uses the software. After the recipient has used the free software he can purchase a copy for a price, which purchased copy does not include the one of the one-time use, the partial use, the partially enhanced audio signal use, or the non-save adjustments but which does include the entire signal processing apparatus/software 10 with savable presets.

In another distribution system that is used herein to overcome the above described problem, the various adjustments are preset by someone who is an expert of that type of audio. For example, a performer who made a particular piece or album of music might set the various adjustments to make the music sound exactly as they want it to sound. These adjustments would then be included as presets in a specific copy of signal processing apparatus/software 10. Copies of signal processing apparatus/software 10 including the presets are then sold with compressed music (MP3 or the like).

Accordingly, new and improved methods and apparatus for the distribution and enhancement of digital compressed audio have been disclosed. The new and improved apparatus/software restores decompressed data to substantially its original content and can be sold over the Internet or by equivalent means. Further, various methods for distributing the new and improved apparatus/software are disclosed which provide recipients an opportunity to sample the software and determine whether or not they believe they would like to purchase it.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Apparatus for enhancing digital audio signals after the digital audio signals are compressed and decompressed, the apparatus comprising:

an input terminal for receiving a digital decompressed audio signal;

a digital harmonic enhancer coupled to receive the digital decompressed audio signal and provide a harmonically enhanced audio signal, the harmonic enhancer includes a digital amplifier coupled to provide harmonic distortion, a digital high pass filter coupled to receive the digital decompressed audio signal and to provide a digital high pass audio signal to the digital amplifier, and a digital level adjuster coupled to receive the harmonic distortion from the digital amplifier and to provide a level adjusted harmonic distortion audio signal to one input of a digital adder, the digital adder having a second input coupled to receive the digital decompressed audio signal and to add the harmonically enhanced audio signal to the digital decompressed audio signal to produce the harmonically enhanced audio signal;

a digital warmth adder coupled to receive the digital decompressed audio signal and provide a warmth enhanced audio signal; and a digital frequency equalizer coupled to receive the harmonically enhanced audio signal and the warmth enhanced audio signal and provide a digital enhanced decompressed audio signal.

2. Apparatus as claimed in claim 1 wherein the digital compressed audio signal and the digital decompressed audio signal includes an MP3 format.

3. Apparatus as claimed in claim 1 wherein the digital high pass filter includes an adjustment for varying a frequency band of the digital high pass audio signal.

4. Apparatus as claimed in claim 1 wherein the digital level adjuster includes an adjustment for varying a level of the harmonic distortion from the digital amplifier.

5. Apparatus as claimed in claim 1 wherein the warmth adder includes a saturated digital amplifier with an S-shaped response curve.

6. Apparatus as claimed in claim 5 wherein the response curve of the saturated digital amplifier includes upper and lower saturation areas which are rounded to provide warmth distortion.

7. Apparatus as claimed in claim 1 wherein the frequency equalizer includes a plurality of adjustments for varying levels of different frequency bands within the harmonically enhanced audio signal and the warmth enhanced audio signal.

8. Apparatus as claimed in claim 1 wherein the digital harmonic enhancer, the digital warmth adder, and the digital frequency equalizer are included in a digital signal processor.

9. Apparatus as claimed in claim 1 wherein the digital harmonic enhancer, the digital warmth adder, and the digital frequency equalizer are provided as software for a digital signal processor.

10. Apparatus as claimed in claim 9 wherein the digital harmonic enhancer and the digital frequency equalizer include adjustments for varying a level of the harmonic distortion and for varying levels of different frequency bands within the harmonically enhanced audio signal and the warmth enhanced audio signal.

11. Apparatus as claimed in claim 10 wherein the adjustments are preset to levels determined by an expert of the received digital decompressed audio signal.

12. Apparatus for enhancing digital audio signals after the digital audio signals are compressed and decompressed, the apparatus comprising:

an input terminal for receiving a digital decompressed audio signal;

a digital harmonic enhancer coupled to receive the digital decompressed audio signal and provide a harmonically enhanced audio signal, the harmonic enhancer including a digital high pass filter coupled to receive the digital decompressed audio signal and to provide a digital high pass audio signal, a digital amplifier coupled to receive the digital high pass audio signal and to provide harmonic distortion of the digital high pass audio signal, and a digital level adjuster coupled to receive the harmonically distorted digital high pass audio signal from the digital amplifier and to provide a level adjusted harmonic distortion audio signal to one input of a digital adder, the digital adder having a second input coupled to receive the digital decompressed audio signal and to add the harmonically distorted digital high pass audio signal to the digital decompressed audio signal to produce the harmonically enhanced audio signal, the digital high pass filter including an adjustment for varying a frequency band of the digital high pass audio signal, and the digital level adjuster including an adjustment for varying a level of the harmonic distortion from the digital amplifier;

a digital warmth adder coupled to receive the digital decompressed audio signal and provide a warmth enhanced audio signal, the digital warmth adder including a saturated digital amplifier with an S-shaped response curve wherein the upper and lower saturation areas are rounded to provide warmth distortion; and a digital frequency equalizer coupled to receive the harmonically enhanced audio signal and the warmth enhanced audio signal and provide a digital enhanced decompressed audio signal.

13. Apparatus as claimed in claim 12 wherein the digital harmonic enhancer, the digital warmth adder, and the digital frequency equalizer are included in a digital signal processor.

14. Apparatus as claimed in claim 12 wherein the digital harmonic enhancer, the digital warmth adder, and the digital frequency equalizer are provided as software for a digital signal processor.

15. Apparatus as claimed in claim 14 wherein the digital harmonic enhancer and the digital frequency equalizer include adjustments for varying a level of the harmonic distortion and for varying levels of different frequency bands within the harmonically enhanced audio signal and the warmth enhanced audio signal.

16. Apparatus as claimed in claim 15 wherein the adjustments are preset to levels determined by an expert of the received digital decompressed audio signal.

17. A method of enhancing digital audio signals after the digital audio signals are compressed and decompressed, the method comprising the steps of:

receiving a digital decompressed audio signal;

harmonically enhancing the digital decompressed audio signal by digitally high pass filtering the digital decompressed audio signal to provide a digital high pass audio signal, digitally amplifying the digital high pass audio signal to provide harmonic distortion, adjusting a level of the harmonic distortion from the digital amplifier and providing a level adjusted harmonic distortion audio signal to one input of a digital adder, coupling a second input of the digital adder to receive the digital decompressed audio signal, and adding the harmonically enhanced audio signal to the digital decompressed audio signal in the digital adder to produce a harmonically enhanced audio signal;

adding warmth to the digital decompressed audio signal and providing a warmth enhanced audio signal; and combining and frequency equalizing the harmonically enhanced audio signal and the warmth enhanced audio signal to provide a digital enhanced decompressed audio signal.

18. A method as claimed in claim 17 wherein the step of receiving includes receiving a digital decompressed audio signal produced from a digital compressed audio signal using an MP3 format.

19. A method as claimed in claim 17 wherein the step of harmonically enhancing the digital decompressed audio signal includes providing an adjustment for varying a frequency band of the digital high pass audio signal.

20. A method as claimed in claim 17 wherein the step of adding warmth to the digital decompressed audio signal includes saturation amplifying the digital decompressed audio signal with an S-shaped amplification response curve.

21. A method as claimed in claim 20 wherein the step of saturation amplifying includes producing upper and lower saturation areas which are rounded to provide warmth distortion.

22. A method as claimed in claim 17 wherein the step of combining and frequency equalizing includes providing a plurality of adjustments for varying levels of different frequency bands within the harmonically enhanced audio signal and the warmth enhanced audio signal.

23. A method as claimed in claim 17 including providing the steps of harmonically enhancing, adding warmth, and combining and frequency equalizing in a digital signal processor.

24. A method as claimed in claim 23 wherein the steps of harmonically enhancing and combining and frequency equalizing include providing adjustments for varying a level of the harmonic enhancing and for varying levels of different frequency bands within the harmonically enhanced audio signal and the warmth enhanced audio signal.

25. A method as claimed in claim 24 wherein the step of providing adjustments includes providing preset levels determined by an expert of the received digital decompressed audio signal.

26. A method as claimed in claim 17 including providing the steps of harmonically enhancing, adding warmth, and combining and frequency equalizing as software for a digital signal processor.

27. A method of enhancing digital audio signals after the digital audio signals are compressed and decompressed, the method comprising the steps of:

receiving a digital decompressed audio signal;

harmonically enhancing the digital decompressed audio signal and providing a harmonically enhanced audio signal, the step of harmonically enhancing the digital decompressed audio signal including digitally high pass filtering the digital decompressed audio signal to provide a digital high pass audio signal, digitally amplifying the digital high pass audio signal to provide harmonic distortion, and adjusting a level of the harmonic distortion from the digital amplifier and providing a level adjusted harmonic distortion audio signal to one input of a digital adder, coupling a second input of the digital adder to receive the digital decompressed audio signal, and adding the harmonically enhanced audio signal to the digital decompressed audio signal in the digital adder to produce the harmonically enhanced audio signal;

adding warmth to the digital decompressed audio signal and providing a warmth enhanced audio signal including saturation amplifying the digital decompressed audio signal with an S-shaped amplification response curve producing upper and lower saturation areas which are rounded to provide warmth distortion; and combining and frequency equalizing the harmonically enhanced audio signal and the warmth enhanced audio signal to provide a digital enhanced decompressed audio signal.

28. A method as claimed in claim 27 including providing the steps of harmonically enhancing, adding warmth, and combining and frequency equalizing in a digital signal processor.

29. A method as claimed in claim 27 wherein the steps of harmonically enhancing and combining and frequency equalizing include providing adjustments for varying a level of the harmonic enhancing and for varying levels of different frequency bands within the harmonically enhanced audio signal and the warmth enhanced audio signal.

30. A method as claimed in claim 29 wherein the step of providing adjustments includes providing preset levels determined by an expert of the received digital decompressed audio signal.

31. A method as claimed in claim 27 including providing the steps of harmonically enhancing, adding warmth, and combining and frequency equalizing as software for a digital signal processor.

* * * * *